United States Patent
Lee et al.

(10) Patent No.: US 8,994,312 B2
(45) Date of Patent: Mar. 31, 2015

(54) METHOD AND SYSTEM FOR CONTROLLING GAIT OF ROBOT

(71) Applicant: Hyundai Motor Company, Seoul (KR)

(72) Inventors: Seok Won Lee, Chungcheongnam-do (KR); Woo Sung Yang, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/815,977

(22) Filed: Mar. 18, 2013

(65) Prior Publication Data

US 2014/0184128 A1     Jul. 3, 2014

(30) Foreign Application Priority Data

Dec. 27, 2012 (KR) .......................... 10-2012-0154476

(51) Int. Cl.
  *B25J 5/00*  (2006.01)
  *B25J 9/16*  (2006.01)

(52) U.S. Cl.
  CPC .............. *B25J 9/1607* (2013.01); *Y10S 901/01* (2013.01)
  USPC .............. 318/568.12; 318/568.1; 318/568.16; 318/568.24; 700/245; 901/1

(58) Field of Classification Search
  USPC ............... 318/568.12, 568.18, 568.2, 568.16, 318/568.1, 568.24; 700/245, 258
  See application file for complete search history.

(56) References Cited

U.S. PATENT DOCUMENTS

| | | | |
|---|---|---|---|
| 6,243,623 B1* | 6/2001 | Takenaka et al. | 700/245 |
| 6,289,265 B1* | 9/2001 | Takenaka et al. | 700/245 |
| 6,807,869 B2* | 10/2004 | Farringdon et al. | 73/862.046 |
| 6,978,684 B2* | 12/2005 | Nurse | 73/862.041 |
| 7,053,577 B2* | 5/2006 | Nagasaka | 318/568.12 |
| 7,400,939 B2* | 7/2008 | Nagasaka | 700/245 |
| 8,261,611 B2* | 9/2012 | Kim et al. | 73/172 |
| 8,525,386 B2* | 9/2013 | Pas et al. | 310/314 |
| 8,749,115 B2* | 6/2014 | Pas et al. | 310/314 |
| 2003/0097878 A1* | 5/2003 | Farringdon et al. | 73/819 |
| 2004/0055396 A1* | 3/2004 | Morimoto | 73/862.045 |
| 2005/0016778 A1* | 1/2005 | Kitano et al. | 180/8.1 |
| 2005/0038560 A1* | 2/2005 | Nagasaka | 700/245 |
| 2005/0097970 A1* | 5/2005 | Nurse | 73/862.041 |
| 2005/0151497 A1* | 7/2005 | Nagasaka | 318/568.12 |

(Continued)

FOREIGN PATENT DOCUMENTS

| | | |
|---|---|---|
| JP | 2002-301124 A | 10/2002 |
| JP | 2005-074620 A | 3/2005 |

(Continued)

OTHER PUBLICATIONS

Korean Office Action issued in Korean Application No. 10-2012-0154476 on Dec. 16, 2013, 4 pgs.

*Primary Examiner* — Paul Ip
(74) *Attorney, Agent, or Firm* — McDermott Will & Emery LLP

(57) ABSTRACT

A method includes determining whether a robot is walking and a direction in which the robot is walking; measuring an amount of time taken for a sole of a foot of the robot to step on the ground; calculating an imaginary reaction force applied to the sole using a trigonometric function having, as a period, the measured amount of time taken for the sole to step on the ground; and applying the calculated imaginary reaction force to a Jacobian transposed matrix and converting the imaginary reaction force into a drive torque for a lower extremity joint of the robot.

8 Claims, 4 Drawing Sheets

(56) References Cited

U.S. PATENT DOCUMENTS

| | | | |
|---|---|---|---|
| 2007/0068244 A1* | 3/2007 | Billing et al. | 73/172 |
| 2010/0168917 A1* | 7/2010 | Roh | 700/258 |
| 2010/0256537 A1* | 10/2010 | Menga | 601/34 |
| 2011/0098856 A1* | 4/2011 | Yoshiike et al. | 700/246 |
| 2011/0098860 A1* | 4/2011 | Yoshiike et al. | 700/260 |
| 2011/0131838 A1* | 6/2011 | Pas et al. | 36/140 |
| 2011/0146396 A1* | 6/2011 | Kim et al. | 73/172 |
| 2011/0264264 A1* | 10/2011 | Shirokura et al. | 700/245 |

FOREIGN PATENT DOCUMENTS

| | | |
|---|---|---|
| JP | 2008-264882 A | 11/2008 |
| JP | 2010-264019 A | 11/2010 |
| KR | 2011-0083144 A | 7/2011 |
| KR | 10-2012-0069923 A | 6/2012 |

* cited by examiner

METHOD AND SYSTEM FOR CONTROLLING GAIT OF ROBOT

BACKGROUND OF THE DISCLOSURE

1. Field of the Disclosure

The present disclosure relates to a method and system for controlling the gait of a wearable robot based on a walking speed of a wearer and the intended gait of the wearer.

2. Description of the Related Art

The present disclosure relates to a gait control algorithm for reducing a load of a wearable walking robot. When a wearer who is wearing a robot walks, if the robot does not correctly reflect the intended gait of the wearer, the wearer will feel a load from the robot, and the load will be manifested as instability while the wearer is walking.

To overcome the above problem, the present disclosure provides a control algorithm which determines a speed at which the wearer intends to walk, and provides an imaginary reaction force corresponding to the intended movement of a foot that is being swung, thus reducing the load generated by the robot.

Existing wearable robots mainly use a force/torque sensor to determine the intended gait of a wearer. However, such a method requires measures to be implemented that solve problems induced by a chattering phenomenon and noise generation of the sensor when the wearer is walking. Further, the sensor is very expensive, and an additional amplifier circuit and signal processing board are required.

Therefore, according to an embodiment of the present disclosure, the use of the sensor can be minimized. For example, an On/Off switch which is comparatively inexpensive can be provided on the sole of each foot of the robot to determine the intended gait of the wearer.

A representative example of the conventional technique was proposed in Korean Patent Registration No. 10-1179159 B1, entitled "Foot sensor apparatus for wearable robot and method for determining intension of user using the same." This conventional apparatus includes a first sensor provided on an upper surface of each foot of the wearable robot where the toes of the foot of the wearer are positioned, a second sensor provided on the upper surface of each foot of the robot where the ball of the foot of the wearer is positioned, a third sensor provided on the upper surface of each foot of the robot where the heel of the foot of the wearer is positioned, and a controller which determines the intended gait of the wearer based on signals from the first, second and third sensors.

When a load is applied to the first, second or third sensor, the corresponding sensor is turned on; and when no load is applied thereto, it is turned off. When the first, second and third sensors are each turned off, the controller determines that the foot of the wearer is in the air. When the first sensor is turned on but each of the second and third sensors is turned off, the controller determines that the foot is in a plantar-flexion state. When each of the first and second sensors is turned off and the third sensor is turned on, the controller determines that the foot is in a heel-strike state. When each of the first, second and third sensors is turned on, the controller determines that the entire foot of the wearer is brought into contact with the foot of the robot and that the wearer is standing up on the ground.

However, when using the above-mentioned conventional method, it is very difficult to precisely determine the intended gait of the wearer and to actively and variably control the robot. Furthermore, the number of sensors is relatively large, thereby increasing the production cost.

It is to be understood that the foregoing description is provided to merely aid the understanding of the present disclosure, and does not mean that the present disclosure falls under the purview of the related art.

(Patent document 1) KR10-1179159 B1

SUMMARY OF THE DISCLOSURE

An object of the present disclosure is to provide a method and system for controlling the gait of a wearable robot based on a walking speed and an intended gait of a wearer.

In order to accomplish the above object, according to one aspect, the present disclosure provides a method for controlling the gait of a robot, including: determining whether the robot is walking and, if determined to be walking, a direction in which the robot is walking; measuring an amount of time taken for a sole of a foot of the robot to step on a ground; calculating an imaginary reaction force applied to the sole using a trigonometric function having, as a period, the measured amount of time taken for the sole to step on the ground; and applying the calculated imaginary reaction force to a Jacobian transposed matrix and converting the imaginary reaction force into a drive torque for a lower extremity joint of the robot.

The converting may include checking whether the sole of the foot of the robot has been taken off the ground.

The checking may include applying the drive torque to the lower extremity joint associated with the sole of the foot of the robot at a moment when the sole has been taken off the ground.

The determining may include determining whether the robot is walking using a surface contact sensor provided on the sole of the foot of the robot, and the measuring may include measuring the amount of time taken for the sole of the foot of the robot to step on the ground using the surface contact sensor.

The calculating may include multiplying the trigonometric function by a preset size value to calculate the imaginary reaction force.

The calculating may include changing a sign of an x-axis component of the imaginary reaction force depending on the direction in which the robot is walking.

According to another aspect, the present disclosure provides a system for controlling the gait of a robot, including: a surface contact sensor provided on a sole of a foot of the robot; and a control unit measuring a walking state and direction of the robot and an amount of time taken for the sole to step on a ground using the surface contact sensor, the control unit calculating an imaginary reaction force applied to the sole using a trigonometric function having the measured amount of time taken to step on the ground as a period, and applying the calculated imaginary reaction force to a Jacobian transposed matrix to convert the imaginary reaction force into a torque for driving a lower extremity joint of the robot.

The surface contact sensor may include a plurality of tape sensors provided on the sole of the foot of the robot at positions spaced apart from each other.

As described above, a method and system for controlling the gait of a robot according to the present disclosure provides a control algorithm which may reduce a load based on an imaginary reaction force using, e.g., On/Off switches of a foot module so that an inexpensive sensor can be used without needing an expensive F/T sensor. Thereby, the production cost can be reduced. In addition, the present disclosure can more precisely sense the intended gait of the wearer and control the robot.

Furthermore, a method in which the walking speed of the wearer can be calculated using a digital flow of the On/Off switches can avoid the problem of the conventional intention sensing method having low reliability due to chattering and noise of the F/T sensor. Therefore, the present disclosure can provide a comfortable wearing sensation to the wearer.

Moreover, because the present disclosure is based on an imaginary reaction force, an additional circuit/board and a signal processing algorithm, which are used when a sensor actually measures reaction force, are not required.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF PREFERRED EMBODIMENTS

Hereinafter, a method and system for controlling the gait of a robot according to a preferred embodiment of the present disclosure will be described in detail with reference to the attached drawings.

Figure 1:
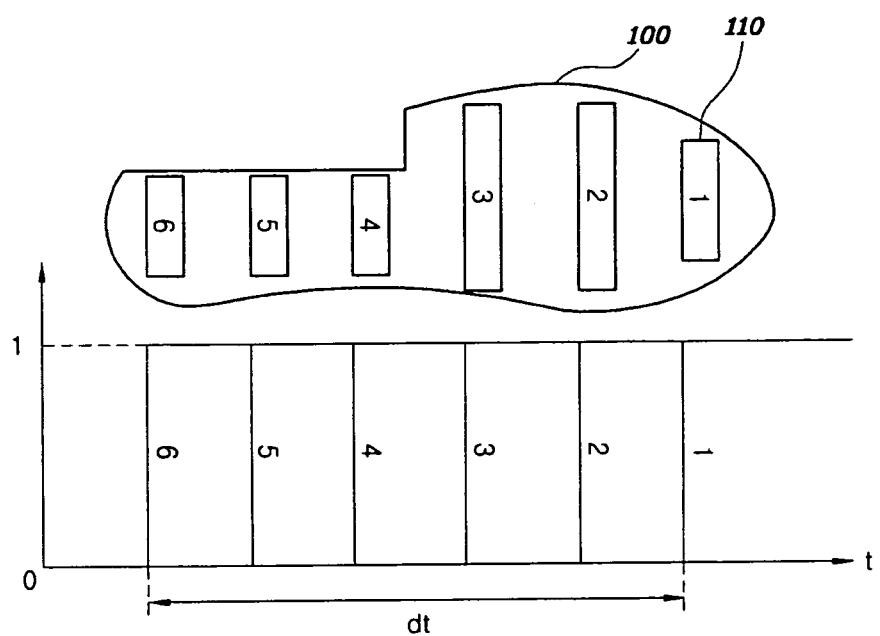
FIG. 1 is a view illustrating surface contact sensors used in a method for controlling the gait of a robot, according to an exemplary embodiment of the present disclosure.
Figure 2:
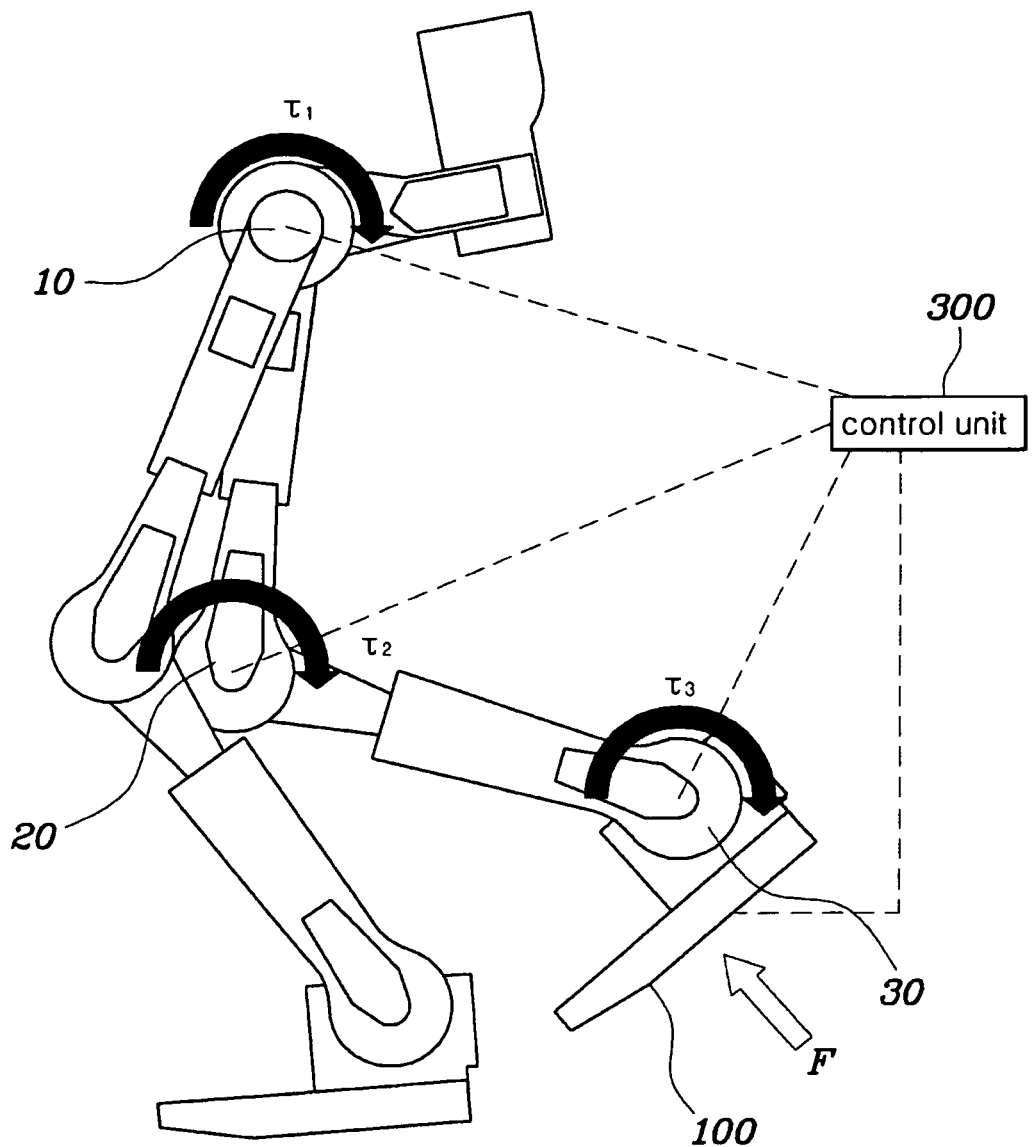
FIG. 2 is a view illustrating construction of a system for controlling the gait of a robot, according to an exemplary embodiment of the present disclosure.
Figure 3:
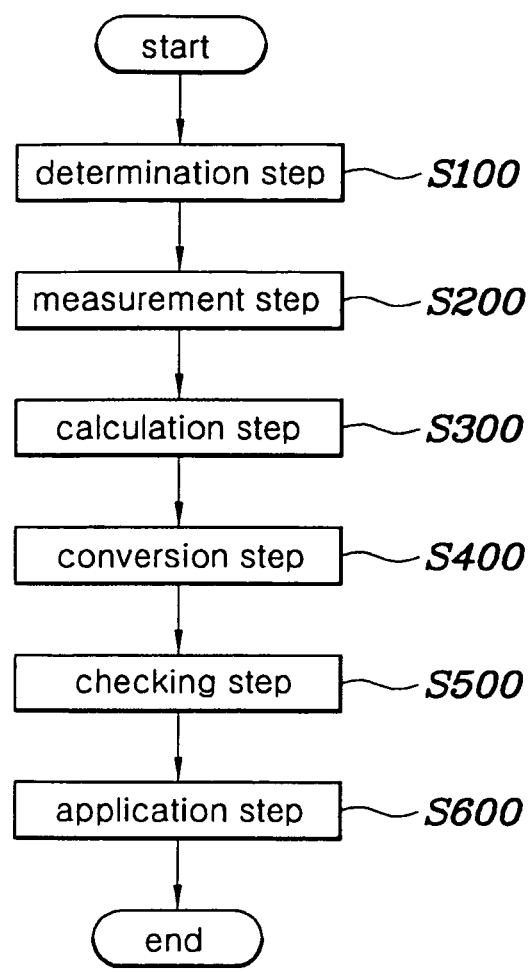
FIG. 3 is a flowchart of an exemplary robot gait control method according to the present disclosure.
Figure 4:
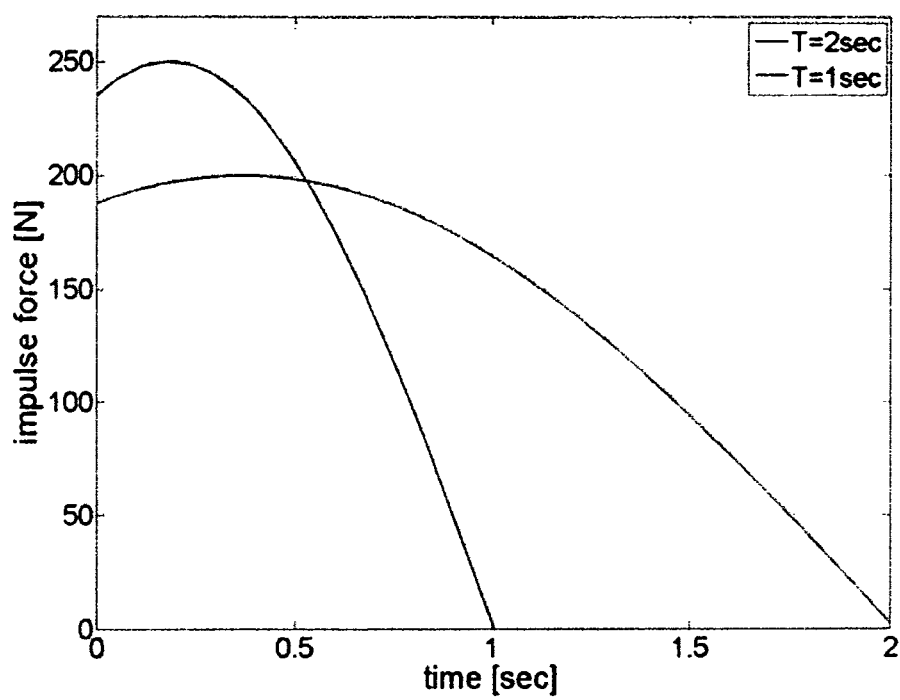
FIG. 4 is a graph showing a trigonometric function of the robot gait control method according to the present disclosure.

FIG. 1 is a view illustrating surface contact sensors used in a method for controlling the gait of a robot, according to an exemplary embodiment of the present disclosure. FIG. 2 is a view illustrating construction of a system for controlling the gait of a robot, according to an exemplary embodiment of the present disclosure. FIG. 3 is a flowchart of an exemplary robot gait control method according to the present disclosure. FIG. 4 is a graph showing a trigonometric function of the robot gait control method according to the present disclosure.

FIG. 3 is a flowchart of an exemplary robot gait control method according to the present disclosure. The robot gait control method includes a determination step S100 of determining whether the robot is in a walking state and determining a direction in which the robot is walking; a measurement step S200 of measuring an amount of time taken for each foot to step on the ground; a calculation step S300 of calculating an imaginary reaction force applied to the sole using a trigonometric function having the measured amount of time as a period; and a conversion step S400 of applying the calculated imaginary reaction force to a Jacobian transposed matrix and converting the calculated imaginary reaction force into a drive torque for a lower extremity joint of the robot.

A representative example of the robot of the present disclosure may be a wearable robot. When a wearer who is wearing the wearable robot is walking, the wearable robot must move in a manner that correctly reflects the intention of the wearer so that the wearer does not feel awkward.

For example, when the wearer takes his/her foot off the ground before swinging the leg, the robot must provide an appropriate reaction force to enable the wearer to more easily raise his/her foot. The faster the wearer walks, the more rapidly the robot responds to movement of the wearer and the more force the robot provides to the wearer. If the robot does not appropriately raise the foot thereof by itself, the wearer who is wearing the robot may have to raise the leg of the robot with his/her own force. In this case, the wearer may feel awkward when walking with the robot.

In the conventional technique, a force-torque sensor is used to sense the intended gait of the wearer, but this sensor is problematic in that it is difficult to precisely check the movement of the wearer, and it is very expensive.

To overcome the problems of the conventional technique, the present disclosure describes a configuration such that, in response to the walking speed of the wearer, the robot can provide an appropriate reaction force to the leg that is being swung. For this purpose, at the determination step S100, whether the robot is in a walking state and a direction in which the robot is walking are determined.

FIG. 1 is a view illustrating surface contact sensors used in the robot gait control method according to an embodiment of the present disclosure. The determination step S100 and the measurement step S200 use the surface contact sensor provided on the sole of each foot of the robot to determine whether the robot is walking and, if it is walking, the direction in which the robot is walking, and to measure an amount of time taken for each foot to step on the ground.

The surface contact sensors 110 are provided on the sole 100 of each foot of the robot. The surface contact sensors 110 may each comprise a plurality of tape sensors which are provided on the sole 100 at positions spaced apart from each other.

For instance, in the exemplary embodiment illustrated in FIG. 1, a surface contact sensor may include six tape sensors labeled 1-6, each of which is provided with an On/Off switch. If the tape sensors are successively turned on from number six to number one, this indicates that the robot is walking forwards. If the tape sensors are successively turned on from number one to number six, this indicates that the robot is walking backwards. If the tape sensors are in the turned on state at the same time over a predetermined period of time, this indicates that the robot is in a standing state rather than walking.

As such, the surface contact sensors 110 which may comprise tape sensors can be used to determine whether the robot is walking or not, and the direction in which the robot is walking. Thereby, when the robot is walking, it can be determined which leg supports the body and which leg is being swung.

In addition, the sensing speeds of the tape sensors can be used to determine a speed at which the sole of the foot steps on the ground. The stepping speed of the sole can be used as a key measure to determine the speed at which the robot is walking. As shown in FIG. 1, an amount of time dt the sole is stepping on the ground is measured as, for example, an amount of time for the number one sensor to the number six sensor to be successively recognized. This amount of time is input as a period of a trigonometric function.

As such, the robot uses the surface contact sensors 110 provided on the sole of each foot to perform the determination step S100 of determining whether the robot is walking or not, and the direction in which the robot is walking if it is walking. Further, the robot can use the surface contact sensors 110 to measure a speed at which each foot steps on the ground.

At the measurement step S200, the amount of time taken for the sole of each foot of the robot to step on the ground is measured. At the calculation step S300, an imaginary reaction force applied to the sole is calculated using a trigonometric function having the measured amount of time as a period.

This can be expressed as the following equation.

$$F_{impulse} = k \cdot F_{mag} \cdot f(t) \quad \text{[Equation 1]}$$

That is, the robot is controlled such that while the robot is walking, at the moment when one leg starts to swing (e.g., when the leg is taken off the ground), the above-mentioned imaginary reaction force supports the sole and is applied to the sole in a direction to push the sole upwards.

When this reaction force is applied to the robot, because the amount of force the wearer may use to raise the leg of the robot can be reduced, the wearer can feel as if they are walking normally.

The imaginary reaction force $F_{impulse}$ is obtained by multiplying $F_{mag}$, that expresses the size of a trigonometric function, by a proportional constant k and reflecting $f(t)$ that is the original form of the trigonometric function.

The trigonometric function $f(t)$ can be expressed in the following various forms.

$$f(t) = \begin{cases} \cos(wt + b) \\ \sin(wt + b) \\ \coth(wt + b) \\ e^{-(wt+b)} \\ a_0 + a_1 t + a_2 t^2 + a_3 t^3 + a_4 t^4 + a_5 t^5 \\ \ldots \end{cases} \quad \text{[Equation 2]}$$

Of the trigonometric functions that are expressed in the above-mentioned forms, the most appropriate form of a trigonometric function is selected and previously input to a controller of the robot. Here, the amount of time taken for the sole of each foot of the robot to step on the ground is used as the period of the corresponding trigonometric function. In this case, an appropriate reaction force corresponding to the walking speed can be generated.

For example, if the walking speed is comparatively high, the amount of time taken for the sole to step on the ground is relatively short. In the trigonometric function that has this amount of time as a period, the period for which it is converged from the maximum to zero is reduced. On the other hand, when the walking speed is comparatively slow, the amount of time taken for the sole to step on the ground is relatively long. In the trigonometric function that has this amount of time as a period, the period for which it is converged from the maximum to zero is increased.

Therefore, when the walking speed is comparatively fast, the reaction force is rapidly eliminated after it has been provided to the robot; and when the walking speed is comparatively slow, the reaction force is slowly eliminated after it has been provided to the robot. In this way, the reaction force can be provided in response to the intention of the wearer. If the reaction force is slowly reduced despite the walking speed being comparatively high, the wearer may inversely feel the reaction force at the moment the wearer puts his/her foot on the ground after having swung the leg. As a result, the wearer may feel awkward.

FIG. 4 is a graph showing a trigonometric function of the robot gait control method according to the present disclosure. As shown in the drawing, when the amount of time taken for the sole to step on the ground is applied as a period of the trigonometric function, the intensity of the reaction force when the period is long is slowly reduced, compared to when the period is short, so that the reaction force can be continuous for a longer time in response to the slower walking speed.

Furthermore, the trigonometric function can be used such that, when the wearer begins to raise his/her foot, the initial strength of the reaction force applied to the robot is relatively high and then smoothly reduced. In this way, the wearer can put his/her foot on the ground again without awkwardness.

An example of an equation for use as the trigonometric function is as follows.

$$F_{impulse,z} = k \cdot F_{mag} \cdot \cos(wt + b) \quad \text{[Equation 3]}$$

$$F_{impulse,x} = \alpha \cdot F_{impulse,z}$$

where, $$w = 2\pi f, \quad f = \frac{1}{dt}$$

$$\alpha = \begin{cases} 1 & \text{for forward walking} \\ -1 & \text{for reverse walking} \end{cases}$$

As shown in Equation 3, the trigonometric function $f(t)$ can be expressed as a cosine function. w can be applied to the function after being converted into a frequency having as a period the amount of time taken for the sole to step on the ground. Here, this is related to a z-direction, that is, a direction perpendicular to the ground. In the case of $F_{impulse,x}$ which is a reaction force component with respect to the z-direction, that is, in a direction parallel to the ground, it is expressed as the z-axis component force with a plus sign (+) for forward walking or a minus sign (−) for reverse walking.

Therefore, a vector component of the imaginary reaction force can be obtained from the sum of the x-axis component and the z-axis component.

Subsequently, at the conversion step S400, the obtained imaginary reaction force is applied to a Jacobian transposed matrix and is converted into the drive torque for the lower extremity joint of the robot.

That is, after the reaction force required by the sole is obtained, it is converted into a drive torque to drive a motor of each joint of the robot, and a drive command is transmitted to the corresponding motor.

This can be obtained by the following equation.

$$\tau_{impulse} = J^T F_{impulse} \quad \text{[Equation 4]}$$

where, $$F_{impulse} = \begin{bmatrix} F_{impulse,x} \\ F_{impulse,y} \\ F_{impulse,z} \end{bmatrix}$$

An such, each $F_{impulse}$ that is a vector component is expressed as a matrix. This can be converted by the Jacobian transposed matrix into a torque required in the corresponding joint. Here, $F_{impulse,y}$, that is, a y component, is typically zero unless the robot walks sideways.

As shown in FIG. 1, a checking step S500 of checking whether the sole of the foot of the robot has been taken off the ground can be performed. Further, an application step S600 of applying a drive torque to the lower extremity joints that are associated with the corresponding sole can be performed when the sole of the foot of the robot is taken off the ground.

That is, the surface contact sensors can check for the moment when the foot, the sole of which has just stepped on the ground, is taken off the ground. At this moment, an imaginary reaction force can be applied to the corresponding sole of the foot so that the wearer can easily walk.

At the calculation step S300, a preset size value ($F_{mag}$) is multiplied by the trigonometric function to calculate the imaginary reaction force. Furthermore, at the calculation step S300, as stated above, the sign of the x-axis component of the imaginary reaction force may be changed depending on the direction in which the robot walks.

FIG. 2 is a view illustrating an exemplary construction of a robot gait control system, according to an embodiment of the present disclosure. The robot gait control system of the present disclosure may include the surface contact sensors 110 provided on the sole 100 of each foot of the robot, and a control unit 300 which measures the walking state and direction of the robot and the amount of time taken for the sole 100 to step on the ground using the surface contact sensors 110. The control unit 300 calculates the imaginary reaction force F applied to the sole 100 using the trigonometric function having the measured amount of time taken to step on the ground as. a period, and applies the calculated imaginary reaction force F to the Jacobian transposed matrix to convert the reaction force into a torque for driving the lower extremity joints of the robot.

Thereby, the imaginary reaction force can be applied to the sole 100 of each foot of the robot. The imaginary reaction force is input, as drive torque, to the motors provided in the corresponding joints 10, 20 and 30 so that the imaginary reaction force can be realized.

As described above, a method and system for controlling the gait of a robot according to the present disclosure provides a control algorithm for reducing a load based on an imaginary reaction force using On/Off switches of a foot module so that an inexpensive sensor can be used without needing an expensive F/T sensor. Thereby, the production cost can be reduced. In addition, the present disclosure can more precisely sense the intended gait of the wearer and control the robot.

Furthermore, a method in which the walking speed of the wearer is calculated using the digital flow of the On/Off switches can avoid the problem of the conventional intention sensing method having low reliability due to chattering and noise of the F/T sensor. Therefore, the present disclosure can provide a comfortable wearing sensation to the wearer.

Moreover, because the present disclosure is based on an imaginary reaction force, an additional circuit/board and a signal processing algorithm, which are used when a sensor actually measures reaction force, are not required.

Although the preferred embodiments of the present disclosure have been disclosed for illustrative purposes, those skilled in the art will appreciate that various modifications, additions and substitutions are possible, without departing from the scope and spirit of the accompanying claims.

What is claimed is:

1. A method for controlling the gait of a robot, comprising:
   determining whether the robot is walking and, if determined to be walking, a direction in which the robot is walking;
   measuring an amount of time taken for a sole of a foot of the robot to step on a ground;
   calculating an imaginary reaction force applied to the sole using a trigonometric function having, as a period, the measured amount of time taken for the sole to step on the ground; and
   applying the calculated imaginary reaction force to a Jacobian transposed matrix and converting the imaginary reaction force into a drive torque for a lower extremity joint of the robot.

2. The method as set forth in claim 1, wherein the converting includes checking whether the sole of the foot of the robot has been taken off the ground.

3. The method as set forth in claim 2, wherein the checking includes applying the drive torque to the lower extremity joint associated with the sole of the foot of the robot when the sole has been taken off the ground.

4. The method as set forth in claim 1, wherein the determining includes determining whether the robot is walking using a surface contact sensor provided on the sole of the foot of the robot, and the measuring includes measuring the amount of time taken for the sole of the foot of the robot to step on the ground using the surface contact sensor.

5. The method as set forth in claim 1, wherein the calculating includes multiplying the trigonometric function by a preset size value to calculate the imaginary reaction force.

6. The method as set forth in claim 1, wherein the calculating includes changing a sign of an x-axis component of the imaginary reaction force depending on the direction in which the robot is walking.

7. A system for controlling the gait of a robot, comprising:
   a surface contact sensor provided on a sole of a foot of the robot; and
   a control unit measuring a walking state and direction of the robot and an amount of time taken for the sole to step on a ground using the surface contact sensor,
   the control unit calculating an imaginary reaction force applied to the sole using a trigonometric function having the measured amount of time taken to step on the ground as a period, and applying the calculated imaginary reaction force to a Jacobian transposed matrix to convert the imaginary reaction force into a torque for driving a lower extremity joint of the robot.

8. The system as set forth in claim 7, wherein the surface contact sensor comprises a plurality of tape sensors provided on the sole of the foot of the robot at positions spaced apart from each other.

* * * * *